United States Patent [19]

Levin et al.

[11] 4,316,766

[45] Feb. 23, 1982

[54] ARTICLE IDENTIFICATION METHOD

[76] Inventors: Julian Levin, 6 - 5th Ave., Emmarentia Extension; Arnold Franks, 59 - 6th Ave., Orange Grove, both of Johannesburg, Transvaal Province, South Africa

[21] Appl. No.: 127,137

[22] Filed: Mar. 4, 1980

[51] Int. Cl.³ .................... B44C 1/22; C03C 15/00; C03C 25/06
[52] U.S. Cl. .................... 156/631; 156/634; 156/654; 156/663; 252/79.3; 428/131
[58] Field of Search .................... 101/128.4; 428/131; 430/308; 156/631, 633, 654, 655, 657, 658, 659.1, 660, 663, 634, 656; 252/79.2, 79.3

[56] References Cited

U.S. PATENT DOCUMENTS 2,067,925 1/1937 Clayton-Kenney ............ 156/663 X
2,127,781 8/1938 McKay ............................ 156/663 X

FOREIGN PATENT DOCUMENTS 116492 2/1943 Australia ............................ 156/631
1302796 1/1973 United Kingdom .

Primary Examiner—William A. Powell
Attorney, Agent, or Firm—Cushman, Darby & Cushman

[57] ABSTRACT

A method of defining an identification marking on an article comprising the location, on a surface of the article in a required area, of a stencil defining a required identification marking; the stencil preferably being temporarily adhered to the surface by means of glue or adhesive, applying to the stencil to contact the surface through the identification marking defined by the stencil, an active substance which is corrosive to, or a solvent of, the material defining said surface of the article; allowing such contact between the active substance and surface to persist for a selected length of time; and thereafter removing the stencil and active substance adhered thereto from the article and cleaning the surface.

9 Claims, 5 Drawing Figures

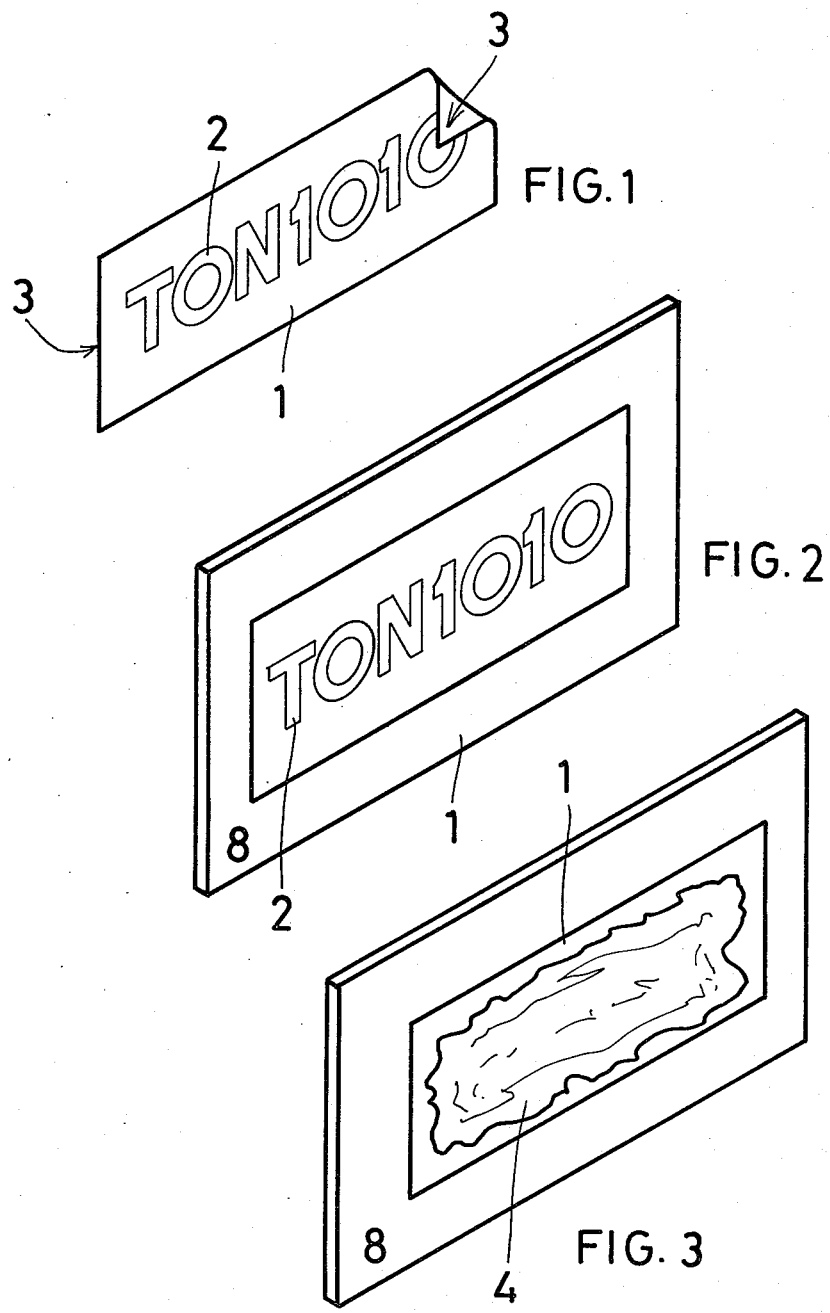

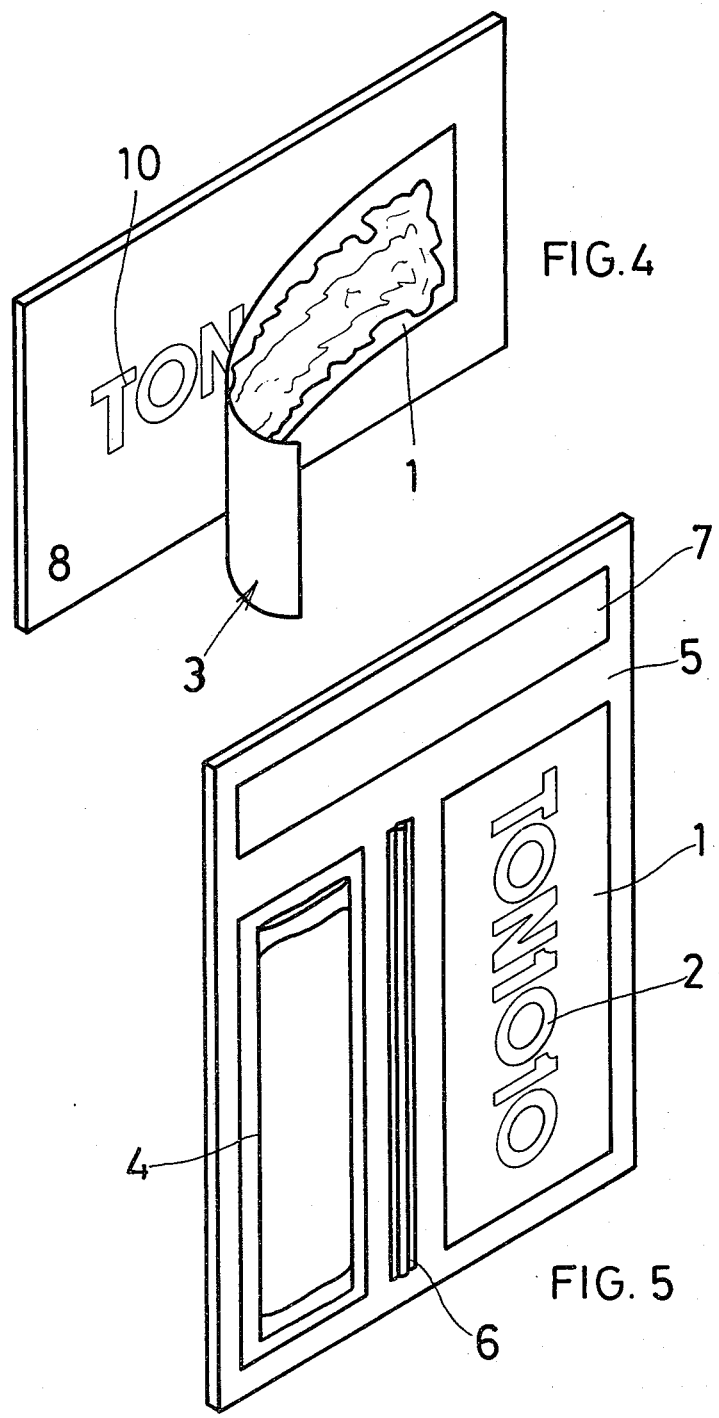

ARTICLE IDENTIFICATION METHOD

This invention relates to article identification wherein an identification character, numeral, reference, name or the like is applied to the article in indelible manner such that the marking cannot be removed easily, if at all.

BACKGROUND OF THE INVENTION

Various processes are known for marking articles as above described and, in particular, there are sand-blasting techniques which can be applied to both glass as well as other materials and wherein sand is fired at the article through a suitable shielding stencil or the like. Such a process involves the use of a sandblasting machine which is not readily portable or in any event not readily available to members of the public. Therefore, the exercise of such a method of applying a suitable identification marking to an article is confined to use by persons skilled in their operation.

Similar comments apply to the markings which may be formed by deforming the surface of the article, for example, by die stamping reference numbers or the like into a metal or other deformable material or, alternatively, by engraving such identification means in the surface of an article. These methods again generally require a skilled operator in order to achieve the desired object.

It must be noted that apart from the requirement of a skilled operator, it is generally necessary in order to achieve the above described methods, to possess or have available special machinery or tools which generally cost a substantial amount of money.

One way of circumventing this difficulty has been proposed in British Pat. No. 1,302,796 wherein a transfer comprising a carrier sheet having a masking of dried etching paste applied thereto. Such transfer could be wetted and then applied to a glass or other surface. However, the edges of such markings are, applicants believe, not sufficiently distinct and the marking could crumble and leave undesired marks at many positions between the carrier sheet and surface while the marking is being applied. Thus, it is believed, the edges of such a marking are not properly contained for general use or, in fact, transport and storage.

It is the object of this invention to provide a method and means for providing an identification marking on an article which does not require the use of costly equipment in order to achieve such marking and also which does not require much, if any, experience in carrying out the method.

DETAILED DESCRIPTION OF THE INVENTION

In accordance with one aspect of this invention there is provided a method of defining an identification marking on an article comprising the location, on a surface of the article in a required area, of a stencil defining a required identification marking; applying to the stencil to contact the surface through the identification marking defined by the stencil, an active substance which is corrosive to, or a solvent of, the material defining said surface of the article; allowing such contact between the active substance and surface to persist for a selected length of time; and thereafter removing the stencil and active substance adhered thereto from the article and cleaning the surface.

Further features of the invention provide for the stencil to be made of a material substantially inert relative to both the surface of the article and the active substance; for the stencil to be of a flexible nature and preferably to comprise a plastics or like foil or film suitably perforated to define the identification marking (i.e. the areas where contact is to be allowed between the surface of an article and the active substance); for the perforation of such a foil or film stencil to be achieved using electrostatic means wherein electrons or the like are accelerated through the foil or plastics material according to a positive or negative pattern governing the operation of such electrostatic means; for the stencil to be provided with a layer of glue or adhesive on one surface thereof to enable it to be adhered to a surface of an article to be marked; and for the active substance to be a mixture with a suitable diluent or carrier and having a suitable consistency, preferably a stiff pastelike consistency which would prevent it from running, or otherwise moving of its own accord while in contact with the stencil and surface of an article to be marked.

The invention also provides stencils particularly designed for implementing the above defined method as well as active material in a suitable form and packaged to enable the defined method to be carried out by a recipient of the package of material.

The invention further provides a kit comprising one or more stencils as above defined, together with a container containing suitable material for implementing the above defined method and wherein instructions are provided as to the application of the stencil and active material to a surface to be marked.

It will be understood that numerous different types of materials could be marked according to the invention and, in particular, there are to be mentioned glass, ceramic materials and metals. In the area of application of identification markings to glass, there are numerous applications of the invention and these include the application of an identification marking, such as a registration number, to the glass parts, for example, the windscreen, anti-draft windows, side windows, headlights or the like of a motor vehicle as well as the personalisation of glassware, such as drinking glasses, television screens, mirrors or the like. Articles of particular interest and which are made of metal include wheels and hub-caps of an expensive nature as are provided on some motor vehicles and which can be etched according to the invention to provide indelible identification markings therein.

Although the above defined pastelike form of active material is preferred, it is within the scope of this invention to apply to a surface of an article to be marked, a stencil and thereafter to spray or brush a thin layer of corrosive or solvent material over at least the exposed areas of the surface which are accessible through the stencil.

It has been found that where glass is to be marked, a pastelike substance as mentioned above is to be preferred. In fact, it is preferred that the active material be mixed with a suitable diluent in order to provide the required consistency of a thick paste and wherein ammonium bifluoride is included as the active ingredient. The ammonium bifluoride is preferably not totally dissolved by any means so that an attractive frosted appearance is provided when the active material is applied to glass or other suitable surfaces. It is believed that this is achieved as a result of the increased concentration of ammonium bifluoride in the immediate vicinity of a crystal thereof.

DESCRIPTION OF THE DRAWINGS

In order that the invention may be more fully understood, one embodiment thereof will now be described with reference to the accompanying drawings in which:

FIG. 1 illustrates in perspective view a stencil made of flexible material;

FIG. 2 illustrates a stencil as applied to a surface to be marked;

FIG. 3 illustrates the next step in performing the method of this invention, namely, where the active material is located on the stencil to contact the surface through the apertures therein;

FIG. 4 illustrates the stencil being subsequently removed from the surface; and, FIG. 5 illustrates a kit according to this invention.

As shown clearly in FIG. 1, a stencil 1 is made of a plastics foil or film of material which is substantially impervious to water, most common reagents, and in addition to ammonium bifluoride. The stencil is manufactured by causing the identification marking, in this case a number 2 to be carried by a carrier sheet which is passed through an electrostatic machine adapted to cause electrons to pass through the foil in the regions corresponding to the area occupied by the characters and numerals of the identification number. This results in a multitude of small perforations being provided in the areas defining the characters and numbers so that such areas are substantially impervious.

The above process is preferably carried out with an appreciable number of such stencils being interconnected to form one large sheet thereof which can be subdivided as required subsequently. Conveniently, such separation can be achieved by defining dark lines bordering the area containing each individual stencil and thus these areas are perforated as are the identification characters and numerals and the foil can simply be torn along these lines easily. Alternatively, the individual stencils can be cut from a large sheet thereof.

A convenient method of producing such stencils has been found to involve the utilisation of commercially available electrostatic machinery utilised for manufacturing duplicator stencils made of plastics foil, and in fact, such foil is eminently suitable for the purposes of this invention.

However, there is applied to the surface 3 constituting the back of the stencil an adhesive layer which can conveniently be a water soluble adhesive which is allowed to dry to a suitable extent. Conventional office pastes of a water soluble nature have been found to be suitable in this regard.

For use, in combination with the stencil just described, there is provided a sachet 4 of a pastelike active mixture composed of about three parts of barium sulphate to one part ammonium bifluoride and sufficient water to provide a stiff paste which will not run when applied to a vertical surface. The sachet is sealed and is sold together with one or more of the stencils described above.

Conveniently a kit, which is a feature of this invention, comprises a plurality of stencils made as above described, a sachet of the active material, a mounting board 5 carrying instructions thereon as to the use of the kit and optionally also other items such as a wire, or other tie 6 and a sticker 7 which can be applied to articles marked with the kit. The wire tie would be provided in order to close off an impervious bag into which the used stencils and active material can be placed after use in order to avoid damage to refuse bins or the like.

In order to perform the method of this invention a stencil as described with reference to FIG. 1 is firstly wetted somewhat so that the adhesive on the reverse side 3 becomes activated and excess moisture is then shaken off the stencil. The surface containing the wet adhesive is then applied to a surface 8 of a glass part of a motor vehicle for example, the stencil is pressed onto the surface. If necessary the glue is allowed to dry for a suitable length of time to avoid water from the active material being drawn by capillary action between the stencil and the glass.

Thereafter the active mixture 4 is applied to the stencil to cover the entire area containing the perforated areas or identification markings and it is allowed to react with the glass 8 through the perforations for a predetermined length of time. After the time period has elapsed, for example five minutes, the stencil is peeled off the glass surface, as indicated in FIG. 4, thus leaving the etched identification marking 10 in the glass surface.

The stencil together with the active material which adheres thereto is preferably disposed of in a plastic bag which is tied in a closed condition using a tie 6 as described above.

It will be understood that the identification markings may take any suitable form and are not confined to numerals and letters. In fact, half tones can be achieved using the process of this invention and the electrostatic machine described above so that pictorial representations can be etched into a glass surface using the present invention. Also, signatures or family crests can be etched using the invention and, in particular, may be etched onto glassware such as drinking glasses or the like.

It will further be understood that etching is not confined to glass surfaces but may be applied to metal surfaces such as, for example, the hub-caps of certain types of motor vehicles. Also, ceramic articles may be marked according to the invention and the active material can be changed according to the nature of the surface to be marked. Thus, for example, acids may be utilised in cases where metal is to be marked to replace the ammonium bifluoride mentioned above. However, ammonium bifluoride will react with most metals to etch the surface thereof as in the case of glass.

It will be understood that many variations may be made to the above described embodiment of the invention without departing from the scope hereof. In particular, the etched marking may have a paint or the like applied thereto after it has been formed in order to colour and/or protect it as may be required. Also, the nature of the stencil could be varied as required and also the adhesive could be replaced by a pressure sensitive adhesive. The plastic foil or film could be replaced by any other suitable material which is preferably flexible. Thus, for example, masking tape or other suitable self-adhesive tape which can be provided with a desired stencil pattern therein could be utilised.

What we claim as new and desire to secure by Letters Patent is:

1. A method of defining an identification marking on an article comprising the steps of:

(1) locating on a surface of the article in a required area a flexible plastics foil or film stencil defining a required identification marking in areas where contact occurs between the surface of the article and an active substance wherein the required areas of contact defined by said stencil have a multitude of small perforations formed by electrostatically passing electrons through the stencil material in the required areas thereof;

(2) applying to the stencil to contact the surface through the identification marking defined by the stencil, an active substance which is corrosive to, or a solvent of, the material defining said surface of the article;

(3) allowing such contact between the active substance and surface to persist for a predetermined length of time; and thereafter (4) removing the stencil and active substance adhered thereto from the article and cleaning the thus marked surface.

2. A method as claimed in claim 1 in which the stencil is substantially inert relative to both the active substance and the surface of the article.

3. A method as claimed in claim 2 in which the stencil is temporarily adhered to said surface prior to contact being effected.

4. A method as claimed in claim 1 in which the active substance is, together with a suitable diluent or carrier, formed into a stiff paste.

5. A method as claimed in claim 4 in which the active substance is a fluoride and insufficient liquid is present to dissolve all of such fluoride.

6. A method as claimed in claim 5, wherein said fluoride is ammonium bifluoride.

7. A method as claimed in claim 1 in which the surface marked is that of a glass surface.

8. A method as claimed in claim 7 in which the article marked is that of a part of a motor vehicle.

9. A method as claimed in claim 8 in which the identification marking is a registration number of the vehicle.

* * * * *